(12) United States Patent
Desineni et al.

(10) Patent No.: US 10,120,876 B2
(45) Date of Patent: Nov. 6, 2018

(54) UNGUIDED APPLICATION CRAWLING ARCHITECTURE

(71) Applicant: Samsung Electronics Co., Ltd., Suwon-si, Gyeonggi-do (KR)

(72) Inventors: Kalyan Desineni, Mountain View, CA (US); Manikandan Sankaranarasimhan, Fremont, CA (US); Brahm Singh, Santa Clara, CA (US); Sudhir Mohan, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 14/849,540

(22) Filed: Sep. 9, 2015

(65) Prior Publication Data
US 2016/0335333 A1    Nov. 17, 2016

Related U.S. Application Data

(60) Provisional application No. 62/193,051, filed on Jul. 15, 2015, provisional application No. 62/161,253, filed on May 13, 2015.

(51) Int. Cl.
| | | |
|---|---|---|
| *G06F 17/30* | (2006.01) | |
| *H04L 29/08* | (2006.01) | |
| *G06F 3/0484* | (2013.01) | |

(52) U.S. Cl.
CPC .... *G06F 17/30156* (2013.01); *G06F 3/04842* (2013.01); *G06F 3/04847* (2013.01);
(Continued)

(58) Field of Classification Search
CPC .......... G06F 17/30156; G06F 3/04842; G06F 3/04847; G06F 17/30489; G06F 17/3053;
(Continued)

(56) References Cited

U.S. PATENT DOCUMENTS

| | | |
|---|---|---|
| 6,782,350 B1 | 8/2004 | Burnley et al. |
| 7,472,413 B1 | 12/2008 | Mowshowitz |

(Continued)

OTHER PUBLICATIONS

U.S. Appl. No. 14/843,929, filed Sep. 2, 2015, Kalyan Desineni.
(Continued)

*Primary Examiner* — Evan Aspinwall
(74) *Attorney, Agent, or Firm* — Jefferson IP Law, LLP

(57) ABSTRACT

A system for automated acquisition of content from an application includes a link tracking module that controls an instance of the application executing within an emulator. For a selected state, the link tracking module controls the executing application instance to navigate to the selected state and identifies a first set of application states reachable by user interface interaction. A state storage module stores records based on the first set. A first state record includes content of a first state of the first set and a unique identifier that uniquely identifies the first state. The unique identifier indicates a path followed within the executing application instance from a default state to the first state, including corresponding user interface interaction. A scraper module, for each of the records in the state storage module, navigates to the state specified by the unique identifier using the indicated path and extracts text from the state.

31 Claims, 6 Drawing Sheets

(52) U.S. Cl.
CPC .... *G06F 17/3053* (2013.01); *G06F 17/30489* (2013.01); *G06F 17/30563* (2013.01); *G06F 17/30864* (2013.01); *G06F 17/30867* (2013.01); *G06F 17/30873* (2013.01); *G06F 17/30882* (2013.01); *G06F 17/30958* (2013.01); *H04L 67/02* (2013.01)

(58) Field of Classification Search
CPC ......... G06F 17/30563; G06F 17/30864; G06F 17/30867; G06F 17/30873; G06F 17/30882; G06F 17/30958; H04L 67/02
USPC ........................................................ 707/602
See application file for complete search history.

(56) References Cited

U.S. PATENT DOCUMENTS

| | | | |
|---|---|---|---|
| 8,145,521 B2 | 3/2012 | Sah et al. | |
| 8,341,538 B1 | 12/2012 | Antczak et al. | |
| 8,489,573 B2 | 7/2013 | Bain | |
| 8,595,186 B1 | 11/2013 | Mandyam et al. | |
| 8,630,994 B2 | 1/2014 | Greene | |
| 8,694,496 B2 | 4/2014 | Erickson | |
| 9,177,058 B2 | 11/2015 | Camelo et al. | |
| 9,318,108 B2 | 4/2016 | Gruber et al. | |
| 9,747,191 B1 | 8/2017 | Marolia et al. | |
| 9,753,627 B2 | 9/2017 | Chaudhri et al. | |
| 9,811,250 B2 | 11/2017 | Louch | |
| 2005/0278728 A1 | 12/2005 | Klementiev | |
| 2006/0062426 A1 | 3/2006 | Levy et al. | |
| 2006/0230011 A1* | 10/2006 | Tuttle | G06F 17/30864 706/62 |
| 2008/0134138 A1 | 6/2008 | Chamieh et al. | |
| 2008/0275844 A1* | 11/2008 | Buzsaki | G06F 17/30424 |
| 2008/0288641 A1* | 11/2008 | Messer | G06F 17/30663 709/226 |
| 2009/0013307 A1 | 1/2009 | Raghavan et al. | |
| 2009/0015599 A1* | 1/2009 | Bennett | G06F 3/0486 345/680 |
| 2010/0153785 A1* | 6/2010 | Keromytis | G06F 11/08 714/38.11 |
| 2011/0314534 A1 | 12/2011 | James | |
| 2012/0054057 A1 | 3/2012 | O'Connell et al. | |
| 2012/0191840 A1* | 7/2012 | Gordon | G06F 17/30887 709/223 |
| 2012/0278793 A1 | 11/2012 | Jalan et al. | |
| 2012/0331372 A1* | 12/2012 | Scoda | G06F 17/3089 715/206 |
| 2013/0066848 A1* | 3/2013 | Tuttle | G06F 17/30864 707/711 |
| 2013/0346382 A1 | 12/2013 | Varthakavi | |
| 2014/0006129 A1 | 1/2014 | Heath | |
| 2014/0040231 A1* | 2/2014 | Lin | G06F 17/30867 707/708 |
| 2014/0236919 A1* | 8/2014 | Liu | G06F 17/30864 707/710 |
| 2015/0169772 A1 | 6/2015 | Alonso et al. | |
| 2015/0186524 A1* | 7/2015 | Liu | G06F 17/30864 707/709 |
| 2016/0019206 A1 | 1/2016 | Mysur et al. | |
| 2016/0027045 A1 | 1/2016 | Kurian et al. | |
| 2016/0335286 A1 | 11/2016 | Desineni et al. | |
| 2016/0335348 A1 | 11/2016 | Desineni et al. | |
| 2016/0335349 A1 | 11/2016 | Desineni et al. | |
| 2016/0335356 A1 | 11/2016 | Desineni et al. | |
| 2017/0083606 A1 | 3/2017 | Mohan | |
| 2017/0185677 A1 | 6/2017 | Anand et al. | |
| 2017/0185679 A1 | 6/2017 | Anand et al. | |

OTHER PUBLICATIONS

U.S. Appl. No. 14/868,294, filed Sep. 28, 2015, Kalyan Desineni.
U.S. Appl. No. 14/869,127, filed Sep. 29, 2015, Kalyan Desineni.
U.S. Appl. No. 14/869,810, filed Sep. 29, 2015, Kalyan Desineni.
U.S. Appl. No. 14/982,192, filed Dec. 29, 2015, Saswat Anand.
U.S. Appl. No. 15/245,261, filed Aug. 24, 2016, Saswat Anand.
Hao, Shuai et al. "PUMA". Proceedings of the 12th annual international conference on Mobile systems, applications, and services—MobiSys 2014, 14 pages.
Lin, Felix et al. "SPADE: Scalable App Digging with Binary Instrumentation and Automated Execution," 2013, 12 pages.
Nath, Suman et al., "App Crawler: Opening Mobile App Black Boxes," 2012, 3 pages.

* cited by examiner

| Text Representation of State URIs | Content |
|---|---|
| Image click (ad) <br> List item 4 ("Coffee and tea") click --> List item 1 click <br> Intent (Rest_Info Activity, ID for Starbucks #235) | Content (for Starbucks Store #235) |
| List item 4 ("Coffee and tea") click --> List item 2 click <br> Intent (Rest_Info Activity, ID for Peet's) | Content (for Peet's Coffee and Tea) |
| List item 4 ("Coffee and tea") click --> List item 3 click <br> Intent (Rest_Info Activity, ID for Biggby) | Content (for Biggby) |
| Image click (ad) --> UI Widget A ("More Info") click <br> List item 4 ("Coffee and tea") click --> List item 1 click --> UI Widget A ("More Info") click <br> Intent (Rest_Info Activity, ID for Starbucks #235) --> UI Widget A ("More Info") click | Content (for Starbucks Store #235 More_Info) |
| List item 4 ("Coffee and tea") click --> List item 2 click --> UI Widget A ("More Info") click <br> Intent (Rest_Info Activity, ID for Peet's) --> UI Widget A ("More Info") click | Content (for Peet's Coffee and Tea More_Info) |
| List item 4 ("Coffee and tea") click --> List item 3 click --> UI Widget A ("More Info") click <br> Intent (Rest_Info Activity, ID for Biggby) --> UI Widget A ("More Info") click | Content (for Biggby More_Info) |
| List item 2 ("Restaurants") click --> List item 1 click <br> Intent (Rest_Info Activity, ID for Papa Romano's) | Content (for Papa Romano's Pizza) |
| List item 2 ("Restaurants") click --> List item 2 click <br> Intent (Rest_Info Activity, ID for Sushi Do) | Content (for Sushi Do) |
| List item 2 ("Restaurants") click --> List item 1 click --> UI Widget A ("More Info") click <br> Intent (Rest_Info Activity, ID for Papa Romano's) click --> UI Widget A ("More Info") click | Content (for Papa Romano's Pizza) |
| List item 2 ("Restaurants") click --> List item 2 click --> UI Widget A ("More Info") click <br> Intent (Rest_Info Activity, ID for Sushi Do) click --> UI Widget A ("More Info") click | Content (for Sushi Do) |

FIG. 5

UNGUIDED APPLICATION CRAWLING ARCHITECTURE

CROSS-REFERENCE TO RELATED APPLICATIONS

This application claims the benefit of U.S. Provisional Application No. 62/161,253, filed on May 13, 2015, and U.S. Provisional Application No. 62/193,051, filed on Jul. 15, 2015. The entire disclosures of the applications referenced above are incorporated herein by reference.

FIELD

The present disclosure relates to crawling applications for content, and more particularly to crawling mobile applications for content.

BACKGROUND

Search engines are an integral part of today's world. A key component of a search engine is the collection of search indices that power the search. In the context of a search engine, a search index can be an inverted index that associates keywords or combinations of keywords to documents (e.g., web pages) that contain the keyword or combination of keywords. In order to generate and maintain these search indexes, most search engines use crawlers to identify documents and information within the documents. A traditional crawler requests a document from a content provider and the content provider provides the requested document to the crawler. The crawler then identifies and indexes the keywords and combinations of keywords in the document.

As the world transitions to a mobile-based architecture, the way content providers provide access to their content is changing. User devices can access content using a variety of different mechanisms. For example, user devices can obtain content from a content provider using a native application dedicated to accessing a software application of the content provider or a web browser that accesses the software application using a web browser. Furthermore, content providers may allow access to different content depending on the geographic region of a user device, the type of user device, the time of day, and/or the operating system of the user device. For these and other reasons, crawling has become an increasingly difficult task.

SUMMARY

A system for automated acquisition of content from an application includes a link tracking module. The link tracking module is configured to control an executing instance of the application executing. The link tracking module is configured to, for a selected state of the application, control the executing application instance to navigate to the selected state and identify a first set of application states reachable from the selected state. Each of the first set of application states is reachable via a respective user interface interaction with the selected state. The system includes a state storage module configured to store records based on the first set of application states. A first state record includes (i) a representation of content of a first state of the first set of application states and (ii) a unique identifier that uniquely identifies the first state within the records of the state storage module. The unique identifier of the first state indicates a path followed within the executing application instance from a default state of the application to the first state. The path includes the user interface interaction corresponding to the first state. The system includes a scraper module configured to, for each of the records in the state storage module, extract text and metadata from the state. Information based on the extracted text and metadata is stored in a data store.

In other features, the link tracking module is configured to execute the instance of the application in an emulator. In other features, the unique identifier of the first state is a uniform resource identifier (URI). In other features, the unique identifier of the first state is based on a concatenation, in order, of each user interface interaction triggered when navigating from the default state to the first state. In other features, the default state is a home state of the application and wherein, upon execution, the application presents the home state to a user of the application. In other features, the representation of the content of the first state requires less storage space than does the content of the first state.

In other features, the representation of the content of the first state is based on a calculated hash of the content of the first state. In other features, the first state record includes a second unique identifier that uniquely identifies the first state within the records of the state storage module. The unique identifier of the first state indicates a second path followed within the application from the default state to the first state. In other features, the system includes a duplicate content detection module configured to determine whether the path and the second path both arrive at the first state. The state storage module is configured to, in response to the duplicate content detection module determining that the path and the second path both arrive at the first state, add the second unique identifier to the first state record instead of creating a second state record.

In other features, the scraper module is configured to, for each of the records in the state storage module, (i) navigate to the state specified by the selected single unique identifier using the path indicated by the selected single unique identifier and (ii) extract text and metadata from the state. In other features, the system includes a path selection module configured to select a single unique identifier for each of the records for use by the scraper module. In other features, the path selection module is configured to select, for each of the records, the single unique identifier that identifies a fastest path to the respective state.

In other features, the link tracking module is configured to identify when an application programming interface call is available for navigating to the first state and store a second unique identifier in the first state record. The second unique identifier indicates the application programming interface call. In other features, the link tracking module is configured to, for a second state reachable from the first state via a first user interface interaction, store a second state record in the state storage module including a unique identifier based on the application programming interface call and the first user interface interaction, and add a second unique identifier to the second state record. The second unique identifier indicates the first user interface interaction and user interface interactions followed from the default state to the first state.

In other features, a search system includes the above system and the data store. The search system further includes a set generation module configured to, in response to a query from a user device, select records from the data store to form a consideration set of records. The search system further includes a set processing module configured to assign a score to each record of the consideration set of records. The search system further includes a results generation module configured to respond to the user device with a subset of the consideration set of records. The subset is selected based on the assigned scores. The subset identifies application states of applications that are relevant to the query.

A method for automated acquisition of content from an application includes executing an instance of the application. The method further includes for a selected state of the application, (i) controlling the executing application instance to navigate to the selected state and (ii) identifying a first set of application states reachable from the selected state. Each of the first set of application states is reachable via a respective user interface interaction with the selected state. The method further includes storing records based on the first set of application states. A first state record includes (i) a representation of content of a first state of the first set of application states and (ii) a unique identifier that uniquely identifies the first state within the stored records. The unique identifier of the first state indicates a path followed within the executing application instance from a default state of the application to the first state. The path includes the user interface interaction corresponding to the first state. The method further includes, for each of the stored records, extracting text and metadata from the state. The method further includes storing information based on the extracted text and metadata in a data store.

In other features, the instance of the application is executed within an emulator. In other features, the unique identifier of the first state is a uniform resource identifier (URI). In other features, the method includes forming the unique identifier of the first state by concatenating, in order, each user interface interaction triggered when navigating from the default state to the first state. In other features, the default state is a home state of the application and wherein, upon execution, the application presents the home state to a user of the application. In other features, the representation of the content of the first state requires less storage space than does the content of the first state.

In other features, the method includes generating the representation of the content of the first state by calculating a hash of the content of the first state. In other features, the first state record includes a second unique identifier that uniquely identifies the first state within the stored records. The unique identifier of the first state indicates a second path followed within the application from the default state to the first state.

In other features, the method includes determining whether the path and the second path both arrive at the first state and, in response to determining that the path and the second path both arrive at the first state, adding the second unique identifier to the first state record instead of creating a second state record. In other features, the method includes selecting a single unique identifier for each of the records for use in the extracting. In other features, the method includes, for each of the stored records, navigating to the state specified by the selected single unique identifier using the path indicated by the selected single unique identifier before extracting text and metadata from the state.

In other features, the selecting includes, for each of the records, selecting the single unique identifier that identifies a fastest path to the respective state. In other features, the method includes identifying when an application programming interface call is available for navigating to the first state and storing a second unique identifier in the first state record. The second unique identifier indicates the application programming interface call. In other features, the method includes, for a second state reachable from the first state via a first user interface interaction storing a second state record including a unique identifier based on the application programming interface call and the first user interface interaction, and adding a second unique identifier to the second state record. The second unique identifier indicates the first user interface interaction and user interface interactions followed from the default state to the first state.

In other features, a search method for operating a mobile application search system includes the above method. The search method further includes, in response to receiving a query from a user device, selecting records from the data store to form a consideration set of records. The search method further includes assigning a score to each record of the consideration set of records. The search method further includes responding to the user device with a subset of the consideration set of records. The subset is selected based on the assigned scores. The subset identifies application states of applications that are relevant to the query.

In other features, a non-transitory computer-readable medium stores processor-executable instructions configured to perform any of the above methods.

BRIEF DESCRIPTION OF THE DRAWINGS

The present disclosure will become more fully understood from the detailed description and the accompanying drawings.

FIG. 5 is an illustration of an example state table generated by unguided app crawling according to the principles of the present disclosure.

In the drawings, reference numbers may be reused to identify similar and/or identical elements.

DETAILED DESCRIPTION

Example User Interface

Figure 1:
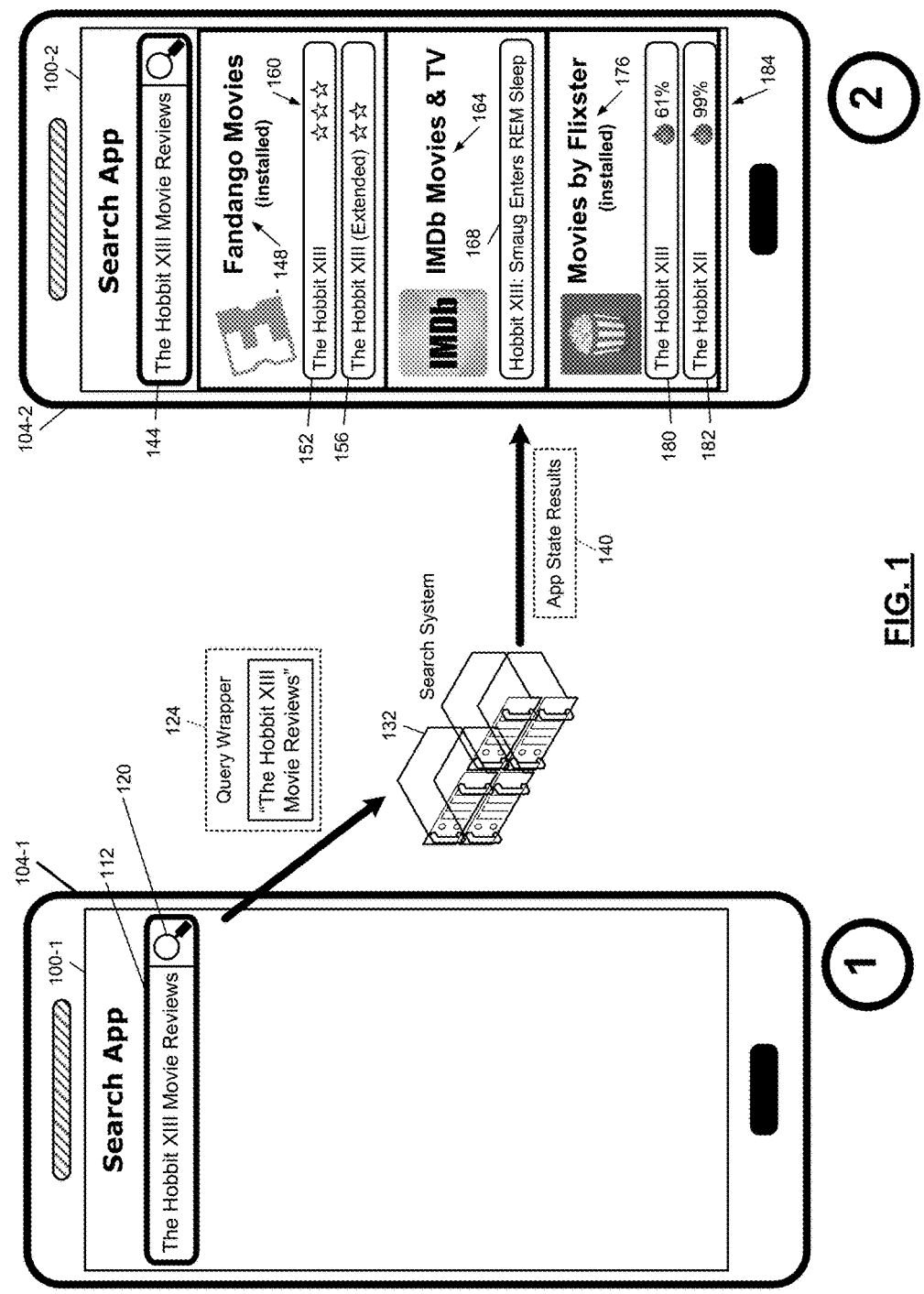
FIG. 1 is a combined functional block diagram and graphical user interface example according to the principles of the present disclosure.

In FIG. 1, an unsophisticated Search App 100 is shown running on a user device, such as smartphone 104. A first state of the Search App 100 is shown at 100-1, and the corresponding reference numeral for the smartphone 104 is 104-1. In the simple interface of the Search App 100-1, a search bar 112 allows a user to perform a search—in this case, for reviews of a (thankfully) fictional movie "The Hobbit XIII."

When a user of the Search App 100 selects (such as by tapping their finger on) a button 120 (having a magnifying glass icon), a query wrapper 124 is sent to a search system 132. Example contents of the query wrapper 124 may include a text query, such as "The Hobbit XIII Movie Reviews." Note that the text in the query wrapper 124 includes not just the function (movie reviews) but also an indication of an entity ("The Hobbit XIII") that is the target of the function. This indicates the user's intent that not only should a movie review app be shown, but preferably a state of the movie review app that directly provides reviews of The Hobbit XIII.

The search system 132, as described in more detail below, identifies relevant apps and app states based on the query wrapper 124. For example, relevant app states will generally include apps that have movie review functionality and that include a state with movie reviews of the identified entity ("The Hobbit XIII"). The search system 132 returns app state results 140 to the smartphone 104, and example contents of the app state results 140 are described in more detail below.

A graphical presentation of the app state results 140 is displayed in a state 100-2 of the Search App 100, and the corresponding reference numeral for the smartphone 104 showing the state 100-2 is 104-2. The graphical results may be displayed in a portion of the Search App 100. In various implementations, the results may slide in from one side or from the top or bottom, suggesting to the user that the results can be dismissed by swiping in an opposite direction. The search string that yielded the results may be presented to the user, such as in a textbox 144. The textbox 144 may allow the user to revise the search string in order to perform additional searches.

Each graphical result of the app state results 140 may include a header (or, title), such as the header "Fandango Movies" at 148. The header may be the same as a title of an app, and may also indicate whether the app is installed. As shown in FIG. 1 with an "installed" parenthetical, "Fandango Movies" is already installed on the smartphone 104. Other text, such as "Open," may similarly indicate that the app is already installed. Apps not yet installed may be indicated with "Download" or "Install" labels. Equivalently, icons or other visual cues may distinguish between apps that can simply be opened (including native apps and, as described in more detail below, web apps) or first need to be installed.

Two specific states are displayed with respect to the "Fandango Movies" app: "The Hobbit XIII" at 152 and "The Hobbit XIII (Extended)" at 156. This text may be the title text of the corresponding state in the "Fandango Movies" app. Additional data associated with each of these states may be shown. For example, the search system 132 may indicate that "The Hobbit XIII" state of the "Fandango Movies" app includes a 3-star rating. This 3-star rating may be shown at 160. Other data may include snippets of text (such as the first few words of a review), an image (such as a screenshot of the state), a reliability metric (such as number of user reviews), a freshness metric (such as most recent observed update to the state), etc.

These specific states may include user-selectable links directly to the corresponding entries in the "Fandango Movies" app. In other words, in response to user selection (such as by tapping the area of the screen associated with "The Hobbit XIII" 152), the Search App 100 will open the "Fandango Movies" app to the state where movie reviews are shown for "The Hobbit XIII." As described in more detail below, this direct action may be accomplished by passing an identifier of the "The Hobbit XIII" state as a parameter to the "Fandango Movies" app or by executing a script that navigates to the state for the "The Hobbit XIII" from another state of the "Fandango Movies" app.

If the user selects an area of the graphical results in the Search App 100 that is associated with the "Fandango Movies" app, but not with one of the specific states 152 or 156, the Search App 100 may open the "Fandango Movies" app to a default state. In other implementations, selecting an area not associated with one of the specific states 152 or 156 will result in no action.

A deep view card for an application or a state of an application shows additional information, not just the identification of the application or application state. For example, the information may include a title of the application state or a description of the application state, which may be a snippet of text from the application state. Other metadata may be provided from the application state, including images, location, number of reviews, average review, and status indicators. For example, a status indicator of "open now" or "closed" may be applied to a business depending on whether the current time is within the operating hours of the business.

Some deep view cards may emphasize information that led to the deep view card being selected as a search result. For example, text within the deep view card that matches a user's query may be shown in bold or italics. The deep view card may also incorporate elements that allow direct actions, such as the ability to immediately call an establishment or to transition directly to a mapping application to get navigation directions to the establishment. Other interactions with the deep view card (such as tapping or clicking any other area of the deep view card) may take the user to the indicated state or application. As described in more detail below, this may be accomplished by opening the relevant app or, if the app is not installed, opening a website related to the desired application state. In other implementations, an app that is not installed may be downloaded, installed, and then executed in order to reach the desired application state.

In other words, a deep view card includes an indication of the application or state as well as additional content from the application or state itself. The additional content allows the user to make a more informed choice about which result to choose, and may even allow the user to directly perform an action without having to navigate to the application state. If the action the user wants to take is to obtain information, in some circumstances the deep view card itself may provide the necessary information.

A deep view is presented for "IMDb Movies & TV" at 164. A user-selectable link 168 is shown for a state of the "IMDb Movies & TV" app titled "The Hobbit XIII: Smaug Enters REM Sleep." The "IMDb Movies & TV" app is not shown with an "installed" parenthetical, indicating that download and installation must first be performed.

Selecting the user-selectable link 168 may therefore trigger the opening of a digital distribution platform in either a web browser or a dedicated app, such as the app for the GOOGLE PLAY STORE digital distribution platform. The identity of the app to be downloaded (in this case, the IMDb app) is provided to the digital distribution platform so that the user is immediately presented with the ability to download the desired app. In some implementations, the download may begin immediately, and the user may be given the choice of approving installation. Upon completion of installation, control may automatically navigate to the desired state of the "IMDb Movies & TV" app—that is, the state for "The Hobbit XIII: Smaug Enters REM Sleep".

A "Movies by Flixster" app title is shown at 176, and is associated with a user-selectable link 180 for a state titled "The Hobbit XIII" and a user-selectable link 182 for a state titled "The Hobbit XII." The user-selectable link 180 includes additional data associated with the state for "The Hobbit XIII." Specifically, graphical and numerical representations of critics' reviews of the movies "The Hobbit XIII" and "The Hobbit XII" are depicted at 184.

Search Module

Figure 2:
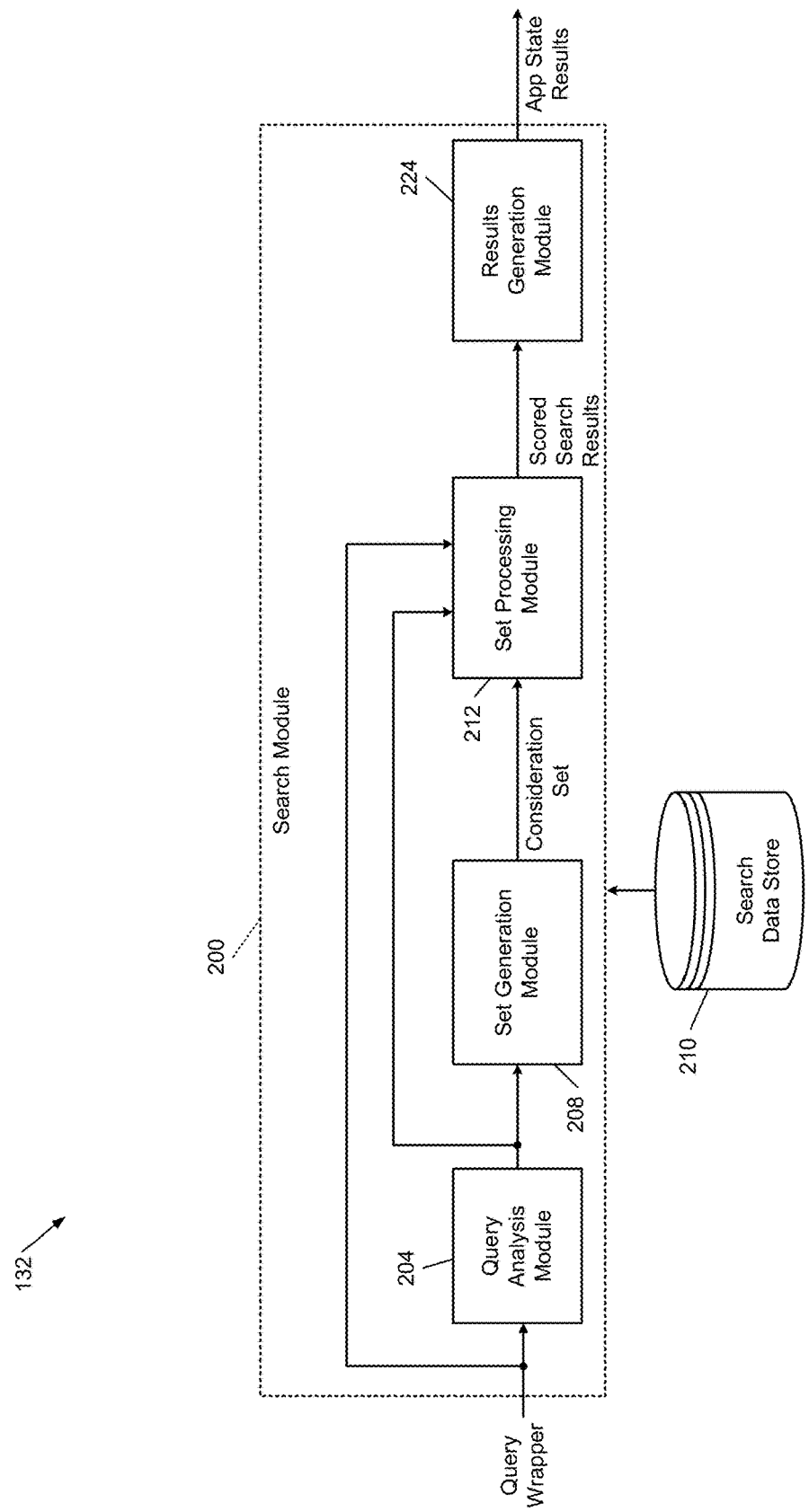
FIG. 2 is a functional block diagram of an example implementation of the search system of FIG. 1.

In FIG. 2, an example implementation of the search system 132 includes a search module 200. The search module 200 includes a query analysis module 204 that receives a query wrapper, such as the query wrapper 124 of FIG. 1. The query analysis module 204 analyzes the text query from the query wrapper. For example, the query analysis module 204 may tokenize the query text, filter the query text, and perform word stemming, synonymization, and stop word removal. The query analysis module 204 may also analyze additional data stored within the query wrapper. The query analysis module 204 provides the tokenized query to a set generation module 208.

The set generation module 208 identifies a consideration set of application state records from a search data store 210 based on the query tokens. Application (equivalently, app) state records are described in more detail in FIG. 3A and FIG. 3B. In various implementations, the search data store 210 may also include app records. In various implementations, an app record may be stored as an app state record that simply has a predetermined value, such as null, for the specific state of the app.

App state records in the search data store 210 may be generated by crawling and scraping apps according to the principles of the present disclosure. Some or all of the contents of the records of the search data store 210 may be indexed in inverted indices. In some implementations, the set generation module 208 uses the APACHE LUCENE software library by the Apache Software Foundation to identify records from the inverted indices. The set generation module 208 may search the inverted indices to identify records containing one or more query tokens. As the set generation module 208 identifies matching records, the set generation module 208 can include the unique ID of each identified record in the consideration set. For example, the set generation module 208 may compare query terms to an app state name and app attributes (such as a text description and user reviews) of an app state record.

Further, in some implementations, the set generation module 208 may determine an initial score of the record with respect to the search query. The initial score may indicate how well the contents of the record matched the query. For example, the initial score may be a function of term frequency-inverse document frequency (TF-IDF) values of the respective query terms.

A set processing module 212 receives unique IDs of app state records identified by the set generation module 208 and determines a result score for some or all of the IDs. A result score indicates the relevance of an app state with respect to the tokenized query and context parameters. In various implementations, a higher score indicates a greater perceived relevance.

For example, other items in the query wrapper may act as context parameters. Geolocation data may limit the score of (or simply remove altogether) apps that are not pertinent to the location of the user device. A blacklist in the query wrapper may cause the set processing module 212 to remove app records and/or app state records from the consideration set that match the criteria in the blacklist, or to set their score to a null value, such as zero.

The set processing module 212 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 212 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 212 may pair the search query with each app state ID and calculate a vector of features for each {query, ID} pair. The vector of features may include one or more record scoring features, one or more query scoring features, and one or more record-query scoring features. In some implementations, the set processing module 212 normalizes the scoring features in the feature vector. The set processing module 212 can set non-pertinent features to a null value or zero.

The set processing module 212 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 212 can calculate result scores for each of the IDs that the set processing module 212 receives. The set processing module 212 associates the result scores with the respective IDs and outputs the most relevant scored IDs.

A results generation module 224 may choose specific access mechanisms from the application records and app state records chosen by the set processing module 212. The results generation module 224 then prepares a results set to return to the user device. Although called "app state results" here, some of the access mechanisms may correspond to a default state (such as a home page) of an app—these may be a special case of an app state record or may be an app record.

The results generation module 224 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 224 may generate or modify access mechanisms based on the operating system identity and version for the user device to which the results are being transmitted. For example, a script to download, install, open, and navigate to a designated state may be fully formed for a specific operating system by the results generation module 224.

If the results generation module 224 determines that none of the native access mechanisms are likely to be compatible with the user device, the search module 200 may send a web access mechanism to the user device. If no web access mechanism is available, or would be incompatible with the user device for some reason (for example, if the web access mechanism relies on the JAVA programming language, which is not installed on the user device), the results generation module 224 may omit the result.

App State Records

Figure 3:
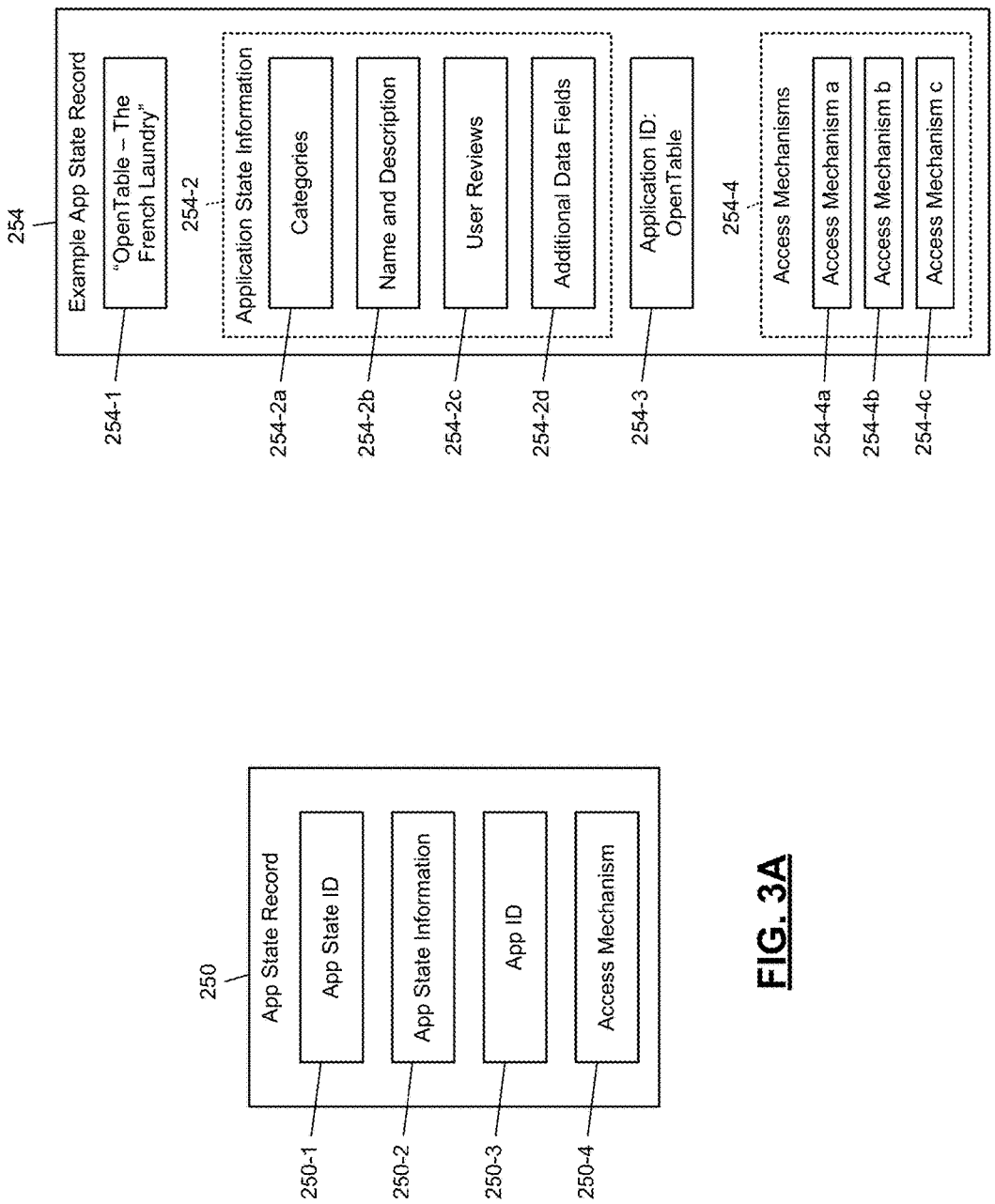
FIG. 3A is a graphical representation of an example application state record format.
FIG. 3B is a graphical representation of an example application state record according to the format of FIG. 3A.

In FIG. 3A, an example format of an app state record 250 includes an app state identifier (ID) 250-1, app state information 250-2, an app identifier (ID) 250-3, and one or more access mechanisms 250-4. The app state ID 250-1 may be used to uniquely identify the app state record 250 in the search data store 210. The app state ID 250-1 may be a string of alphabetic, numeric, and/or special (e.g., punctuation marks) characters that uniquely identifies the associated app state record 250. In some examples, the app state ID 250-1 describes the application state in a human-readable form. For example, the app state ID 250-1 may include the name of the application referenced in the access mechanisms 250-4.

In a specific example, an app state ID 250-1 for an Internet music player application may include the name of the Internet music player application along with the song name that will be played when the Internet music player application is set into the specified state. In some examples, the app state ID 250-1 is a string formatted similarly to a uniform resource locator (URL), which may include an identifier for the application and an identifier of the state within the application. In other implementations, a URL used as the app state ID 250-1 may include an identifier for the application, an identifier of an action to be provided by the application, and an identifier of an entity that is the target of the action.

For example only, see FIG. 3B, which shows an example app state record 254 associated with the OPENTABLE application from OpenTable, Inc. The OPENTABLE application is a restaurant-reservation application that allows users to search for restaurants, read reviews, and make restaurant reservations. The example app state record 254 of FIG. 3B describes an application state of the OPENTABLE application in which the OPENTABLE application accesses information for THE FRENCH LAUNDRY restaurant, a Yountville, Calif. restaurant. An app state ID 254-1 for the example app state record 254 is shown as "OpenTable—The French Laundry."

Another implementation of the displayed app state ID 254-1 is based on a triplet of information: {application, action, entity}. The triplet for the app state record 254 may be {"OpenTable", "Show Reviews", "The French Laundry"}. As mentioned above, this triplet may be formatted as a URL, such as the following: "func://www.OpenTable.com/Show_Reviews/The_French_Laundry". Note that a different namespace is used ("func://") to differentiate from the standard web namespace ("http://"), as the URL-formatted ID may not resolve to an actual web page. For example only, the OpenTable website may use a numeric identifier for each restaurant in their web URLs instead of the human-readable "The_French_Laundry."

Continuing with FIG. 3A, the app state information 250-2 may include data that describes an app state into which an application is set according to the access mechanisms 250-4. The types of data included in the app state information 250-2 may depend on the type of information associated with the app state and the functionality specified by the access mechanisms 250-4. The app state information 250-2 may include a variety of different types of data, such as structured, semi-structured, and/or unstructured data. The app state information 250-2 may be automatically and/or manually generated and updated based on documents retrieved from various data sources, which may include crawling of the apps themselves.

In some examples, the app state information 250-2 includes data presented to a user by an application when in the app state corresponding to the app state record 250. For example, if the app state record 250 is associated with a shopping application, the app state information 250-2 may include data that describes products (such as names and prices) that are shown in the app state corresponding to the app state record 250. As another example, if the app state record 250 is associated with a music player application, the app state information 250-2 may include data that describes a song (such as by track name and artist) that is played or displayed when the music player application is set to the specified app state.

When the app state record 250 corresponds to a default state of an application, the app state information 250-2 may include information generally relevant to the application and not to any particular app state. For example, the app state information 250-2 may include the name of the developer of the application, the publisher of the application, a category (e.g., genre) of the application, a text description of the application (which may be specified by the application's developer), and the price of the application. The app state information 250-2 may also include security or privacy data about the application, battery usage of the application, and bandwidth usage of the application. The app state information 250-2 may also include application statistics, such as number of downloads, download rate (for example, average downloads per month), download velocity (for example, number of downloads within the past month as a percentage of total downloads), number of ratings, and number of reviews.

In FIG. 3B, the example app state record 254 includes app state information 254-2, including a restaurant category field 254-2a of THE FRENCH LAUNDRY restaurant, a name and text description field 254-2b of THE FRENCH LAUNDRY restaurant, user reviews field 254-2c of THE FRENCH LAUNDRY restaurant, and additional data fields 254-2d.

The restaurant category field 254-2a may include multiple categories under which the restaurant is categorized, such as the text labels "French cuisine" and "contemporary." The name and description field 254-2b may include the name of the restaurant ("The French Laundry") and text that describes the restaurant. The user reviews field 254-2c may include text of user reviews for the restaurant. The additional data fields 254-2d may include additional data for the restaurant that does not specifically fit within the other defined fields, such as a menu, prices, and operating hours.

Continuing with FIG. 3A, the app ID 250-3 uniquely identifies an application associated with the app state record 250. For example, a value for application ID 254-3 in the app state record 254 uniquely identifies the OpenTable application. The application ID 254-3 may refer to a canonical OpenTable software product that encompasses all of the editions of the OpenTable application, including all the native versions of the OpenTable application across platforms (for example, IOS and ANDROID operating systems) and any web editions of the OpenTable application.

The access mechanisms 250-4 specify one or more ways that the state specified by the app state record 250 can be accessed. For any given user device, only some of the access mechanisms 250-4 may be relevant. For illustration, the example app state record 254 depicts three access mechanisms 254-4, including access mechanism "a" 254-4a, access mechanism "b" 254-4b, and access mechanism "c" 254-4c.

For example, the access mechanism 250-4a may include a reference to a native IOS operating system edition of the OPENTABLE application along with one or more operations to be performed by the user device. For example, the access mechanism 250-4a may include an application resource identifier for the native iOS edition of the OPENTABLE application and one or more operations that navigate to the state in the OPENTABLE application for THE FRENCH LAUNDRY restaurant.

The access mechanism 250-4b may include a reference to a native ANDROID operating system edition of the OPENTABLE application along with one or more operations to be performed by the user device to navigate to the state in the ANDROID OPENTABLE application for THE FRENCH LAUNDRY. The access mechanism 250-4c may include a reference to a web edition of the OPENTABLE application, such as a URL that corresponds to a web page for THE FRENCH LAUNDRY restaurant on the OPENTABLE web site.

Unguided Crawling

In the web domain, crawlers generally operate by following links between pages. Because of the way pages link to each other, a crawler will sometimes see a page it has already crawled. The web crawler should detect that the same page is being crawled a second time and avoid crawling it. The web crawler may perform this duplicate detection by comparing the URL (uniform resource locator) of a target page to the URLs of already-crawled pages to verify that the target page has not yet been crawled. However, because app states do not have URLs, this problem is harder to solve when crawling apps.

One solution is to uniquely identify a state with a URI (uniform resource identifier), which is a more generalized form of a URL such as is used on the web. A URI may take the form of a functional URL (which specifies a particular starting state, and may correspond one-to-one with a predefined intent) combined with (optional) steps used to get to the state. For example, a particular state may be accessed by navigating to a first state F1 and then selecting button B1 from the user interface. A URI for that state can be labeled as "<F1,B1>". The same state may also be accessed by navigating to state F2 and selecting button B2. Thus the same state may have multiple URIs: "<F1,B1>" and "<F2,B2>".

When crawling, the crawler would ideally be able to detect whether a state is the same as a previous state already crawled. This is difficult because the crawler may have followed a different path to the state then it previously has, so that the URI for the state is different from the previously-crawled URI. To solve this problem, the crawler may use a deduplication module that detects whether the content in the current state is the same as the content in a previously-crawled state.

Content matching may use one or more different methods. Because the content of states may vary when viewed at different times (e.g., different ads may appear, or real-time content may change), a simple hash may not work by itself. Possible solutions include using Bloom filters and fuzzy content matching.

Since apps use UI (user interface) widgets to display content, UI layout may assist in content matching. Each widget may have a layout defining further UI elements inside it. The whole content can be captured in this hierarchical form along with widget info and content, and dumped as, for example, a JSON (JavaScript Object Notation) file. Dumping content may be performed by the app scraper or by a module that uses code forked from the app scraper. The deduplication module will compare this JSON output to previously-obtained JSON output to determine whether there is a match. Naively, two states are similar if they have identical hierarchy and content. However, since even the same state may differ (for example, based on ads), a threshold of matched contents, matched hierarchies, or a combination may be defined.

This threshold may be expressed as a percentage and may be adjusted dynamically, for example having different values between different apps, or between different app state templates. When comparing both UI hierarchy and content, a weighted average may be used to combine a percentage similarity from both into a single overall percentage similarity. The single overall percentage similarity is then compared with a threshold to determine whether the two states should be considered to be the same.

To enable deduplication, the content of each state may be stored and associated with the URIs for that state. As described in more detail below, in some cases the system may observe that an intent fires when a state is loaded. As part of dynamic analysis, APIs (application programming interfaces) used in intent firing may be monitored. As part of this monitoring, which UI action triggered an intent can be detected and therefore associated with the state.

In such a case, the state may be accessed directly using the intent without taking any additional steps. For example, the crawler accesses a state using a URI <F1,B1> and then observes that intent F2 fires. Both <F1,B1> and <F2> may be added to the URI list for that state.

Figure 4:
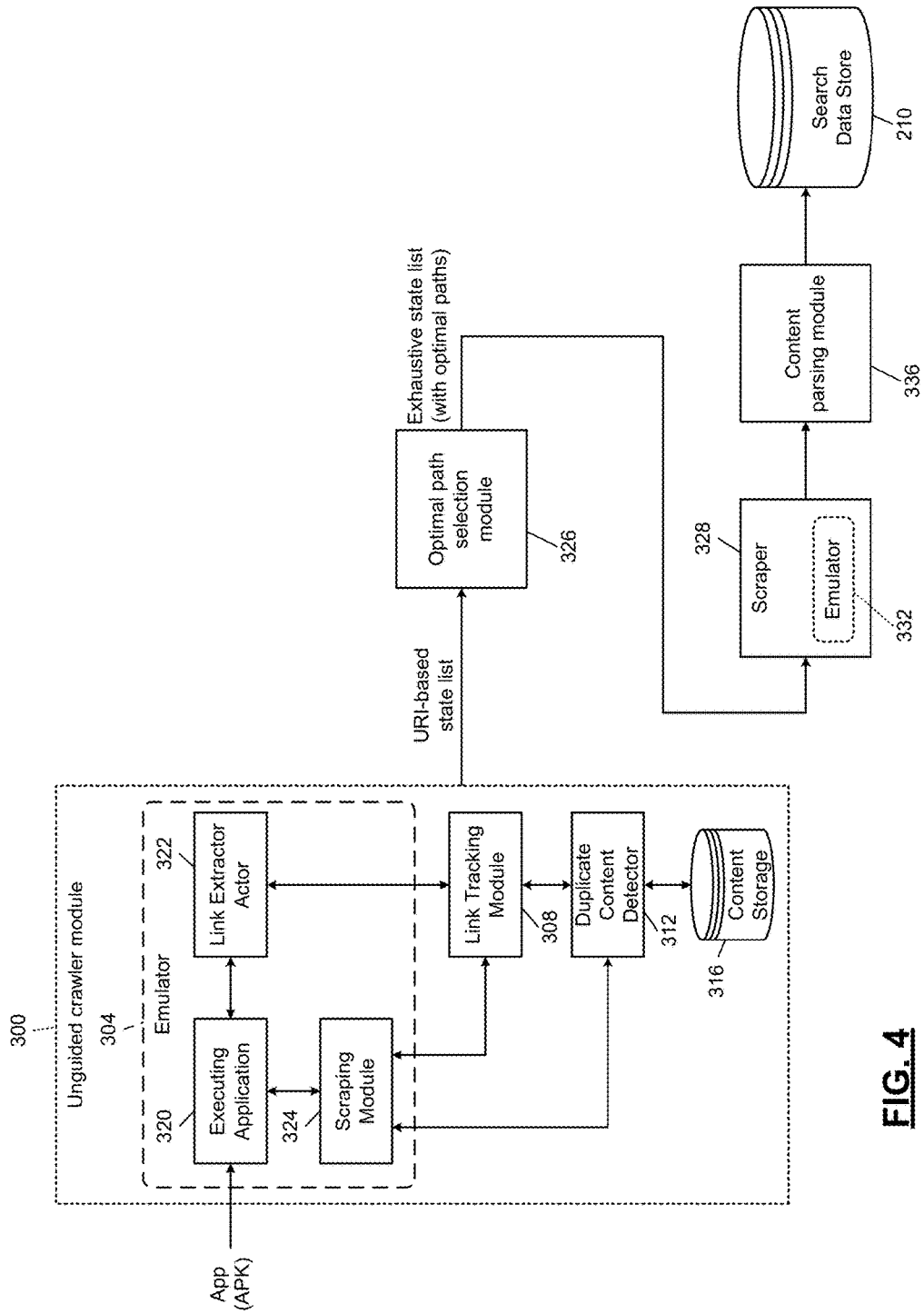
FIG. 4 is a functional block diagram of an unguided app crawling system.

In FIG. 4, an unguided crawler module 300 includes an emulator 304, a link tracking module 308, a duplicate content detector 312, and content storage 316. The unguided crawler module 300 begins with no insight into the application of interest. As explained in more detail in FIG. 6, the unguided crawler module 300 opens up the app (which may be provided as an APK file in some environments) to a home state in the emulator 304. From the home state, the unguided crawler module 300 follows every possible path.

Specifically, the link tracking module 308 determines all of the possible states reachable from the home state via possible user interface interactions and adds those states to a list of states to crawl. For ease of illustration, a single emulator 304 is shown in FIG. 4. However, the link tracking module 308 may operate multiple emulators in parallel, and may assign different states for each respective emulator to crawl.

The emulator 304 emulates a host operating system, such as the ANDROID operating system, in which the application of interest is executed (at 320). In various implementations, the emulator 304 may be instantiated at a cloud hosting operator that may provide compute facilities within which to execute emulator code or that may directly provide emulator instances for one or more mobile device operating systems.

In other implementations, a physical device running the operating system may be used. For example, some operating systems may not have suitable emulators. The physical device may be connected to the link tracking module 308 using a wireless or wired interface, such as USB (universal serial bus). As an example only, a physical smartphone may be connected via USB to an interface card that is controlled by the link tracking module 308.

In order to reach a state within the executing application 320, the link tracking module 308 sends an access path (sometimes referred to as a breadcrumb trail, and described in more detail below) to a link extractor actor 322. When the link extractor actor 322 identifies that an intent is available to reach an activity, the link tracking module 308 passes this information back to the link tracking module 308 as another path to the state.

In various implementations, the link extractor actor 322 executes within the emulator 304 and communicates with the executing application 320 using accessibility hooks or events. The link extractor actor 322 may identify user interface actions from the current state that will result in another state being reached using a scraping module 324. These new states are provided to the link tracking module 308.

In other words, the link extractor actor 322 can provide simulated user input to the executing application 320 and the scraping module 324 extracts content from each displayed state of the executing application 320. The link tracking module 308 can then identify further states to visit from the scraped information and instruct the link extractor actor 322 to follow a user interface path corresponding to the next state of interest.

In implementations where the emulator 304 is instead a physical device, the link extractor actor 322 and the scraping module 324 may be installed as root-level applications on the physical device. Installing a root-level application may include designating the application as a launcher replacement and/or bypassing security limitations of the firmware or operating system regarding privileges of installed apps.

The crawl of an app may optionally begin with a user login. An operator of the unguided crawler module 300 may record steps (user interface events) to perform the login. Alternatively, stored private settings (or authentication tokens) may be present in some ANDROID apps, and may be able to be copied from a device the operator had previously been using. Then the crawl can occur without operator intervention.

Each state that is reached is labeled with a uniform resource identifier (URI) according to the series of user interface interactions that were performed to reach the state. States can be compared by URI: if the URI of a state matches a previous URI, the present state is assumed to be the same as the previous state. A state may be reached through a variety of paths and may therefore be labeled with multiple URIs.

From a given state, the unguided crawler module 300 may generate URIs for new states to crawl by taking the URI of the current state and appending an action corresponding to each UI element on the page. For example, a button B2 available on a state with URI <F1,B1> may be used to generate a URI <F1,B1,B2>. When accessing a state using a URI (during a crawl or for any other reason), the most efficient way of accessing the state should generally be used. This may be a direct URL (access URL) or intent if available; otherwise it will be the URI that has the least number of additional user actions required to access the state.

To identify whether the present state is the same as a prior state with a different URI, the content of each state is stored in the content storage 310. The duplicate content detector 312 compares the content of the present state to the content of prior states. When the content matches, the states are assumed to be the same, and that state is then listed with both URIs. In various implementations, the content storage 310 may store a signature or fingerprint of content within each state. For example, a hash or other compression function may be calculated based on the content in the state. The user interface layout of the state may also be fingerprinted—that is, described in a reduced representation. For example only, the content storage 310 may store a signature of the content of a state as well as a signature of the user interface layout of the state.

Especially because crawling apps for content is generally slower than comparable web crawling, identifying duplicates ahead of time reduces the burden for both crawling and scraping. Techniques to identify duplicates in app content include content metadata tagging, UI (user interface) pattern matching, and API (application programming interface) comparison.

Using content metadata tagging, a set of key fields is identified to create metadata for the content. The attributes are identified in a way that they can uniquely identify the content in the activity. The metadata is hashed and stored in the content storage 310. The duplicate content detector 312 checks the hash of any new state against existing hashes. The hash algorithm may be chosen based on the desire to avoid collisions, but with the flexibility of not needing to be cryptographically secure. In other words, in most implementations, there is no requirement that the hash function be one-way (that is, impossible with reasonable computing resources to determine the input data that resulted in the output).

The length of the hash function may be based on how many unique states are expected in an application, with more states leading to a longer length to reduce the probability of collision to an acceptable level. The hash may be calculated using, as examples only, a cyclic redundancy check, a checksum, Rabin fingerprinting, the Fowler-Noll-Vo algorithm, Pearson hashing, a Jenkins hash function, or a hashCode( ) method of the JAVA programming language.

Regarding UI pattern matching, the crawler can recognize different action UI elements, such as standard ANDROID operating system widgets. An example follows:

```
<accesspath targetState='ActivityBusinessPage'>
  <action name='click'
    widgetId='com.YELP.android:id/nearby' text='Nearby' />
  <action name='select' widgetId='android:id/list'
    rowId='com.YELP.android:id/category_content'
    index='0' />
  <action name='select'
    widgetId='com.YELP.android:id/search_content'
    rowId='com.YELP.android:id/search_inner_layout'
    index='2' />
</accesspath>
```

States that have a different widget hierarchy (or, tree) are unlikely to be the same. Therefore, a fingerprint of the widget tree may be stored in the content storage 310. The fingerprint of the widget tree may include a count of each of various UI elements in the widget tree. To save storage space, the counts may be restricted to a limited number of the most common UI elements. In addition, the fingerprint may be based on a measure of depth or breadth of the widget tree. The fingerprint may also be based on a count of the number of total UI elements located at each depth in the widget tree. The UI fingerprint of a new state can be compared against existing UI fingerprints, and if the similarity with an existing UI fingerprint is less than a threshold, the new state is considered not to be the same as that existing state.

The API calls made by a state may be a unique identifier of the state. For example, a state that sends the same data in an API call to a server may be considered to be the same as another state that sends that same data, even if the response from the server is dynamic and changes over time. For example, in a restaurant info state, the featured reviews may change over time, causing the text content of the state to change over time.

A URI-based state list (such as that shown in FIG. 5) generated by the unguided crawler module 300 is consumed by the optimal path selection module 326. The optimal path selection module 326 selects a fastest URI for each state. For example, this may be the URI with the fewest number of hops (i.e., intents or user interface interactions). If two URIs have the same number of hops, the optimal path selection module 326 may use other criteria, such as preferring a URI that includes an intent, with the assumption that intents will be more consistent than user interface elements.

The optimal path selection module 326 provides the list of shortest URIs to a scraper 328. The URI list is used by the scraper 328 to reach each of the states of interest and extract their contents. The scraper 328 uses an emulator 332 to follow the shortest URI (which may be expressed as a breadcrumb file) for each of the states specified by the optimal path selection module 326. Within the emulator 332, the scraper 328 injects specified programming calls and replays user interface events as specified in the breadcrumb trail for each state of interest.

Upon arriving at the target state, the scraper 328 extracts text, images, and metadata from the state. This information is passed to a content parsing module 336. In other implementations, the data from the scraper 328 may be stored directly into a data warehouse or database.

The scraper 328 may be implemented as a scraping manager that concurrently runs multiple emulators including the emulator 332. Each of the emulators can then independently traverse paths to different states. The scraping manager therefore distributes the states of interest across the emulators and collates the scraped data. In various implementations, the scraping manager may interact with an application executing within one of the emulator instances using an actor similar to the link extractor actor 322, which interacts with the executing application using accessibility hooks/events. In various implementations, the emulator 332 may instead be a physical device, as described above.

The content parsing module 336 may identify content of interest from scraped states and map that data to specific fields to create app state records in the search data store 210. The content parsing module 336 may perform a combination of parsing, transformation, categorization, clustering, etc.

Figure 6:
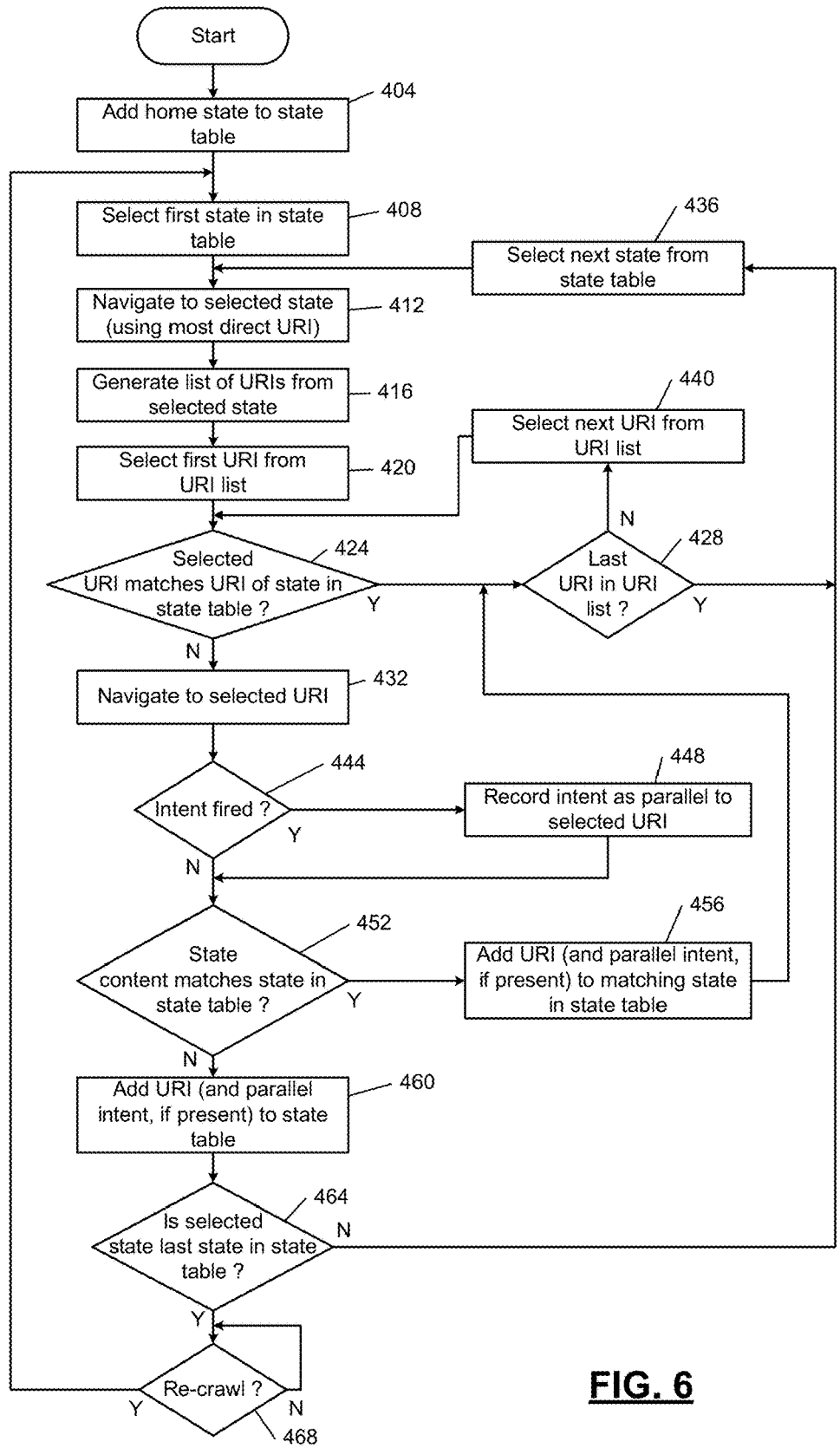
FIG. 6 is a flowchart of example operation of unguided app crawling.

In FIG. 5, an example of a state list generated according to the method of FIG. 6 is shown. For each state, there may be multiple URIs, and in the example of FIG. 5 there is no state with only a single URI. The first state in the state list is for a state with information regarding a STARBUCKS store numbered 235. The unguided crawler will not necessarily recognize that the content of the state corresponds to a Starbucks store: the parenthetical has simply been added for illustration purposes.

The state (which a human would recognize as the restaurant info for Starbucks store #235) was reached from the home state in 3 different ways, resulting in 3 different URIs. The first is for a click or touch on an image (in the actual computer-readable state list, this may be a widget ID) from the homepage that happened to point to this listing. The second required two user interface interactions: one to select "Coffee and tea" from a list, and the next to select the first item from the resulting list of coffee/tea establishments. The third URI for this state involved a single programming call (intent) that specified the activity (or, app state template from which the restaurant info states are created) and an identifier of the state.

In FIG. 6, example operation of an unguided crawler begins at 404, where a home state of an app is added to a state table. At 408, the first state in the state table is selected. At 412, control navigates to the selected state using the most direct URI stored in the state table. At 416, control generates a list of URIs from the selected state. This list of URIs represents any other state that can be reached from the selected state. At 420, control selects a first URI from the generated URI list.

At 424, control determines whether the selected URI matches the URI of a state already in the state table. If so, control transfers to 428; otherwise, control transfers to 432. At 428, if the selected URI is the last URI in the list, control transfers to 436; otherwise, control transfers to 440. At 440, control selects the next URI from the URI list and transfers to 424.

At 432, control navigates to the selected URI, and at 444 determines whether an intent was fired when navigating to the selected URI. If so, control transfers to 448; otherwise, control transfers to 452. At 448, control records the fired intent as being parallel to the selected URI and continues at 452. At 452, control determines whether content of the state matches a state already in the state table. If so, control transfers to 456; otherwise, control transfers to 460.

At 456, control adds the URI and, if recorded, a parallel intent to the matching state in the state table, and control then continues at 428. At 460, control adds the URI as a new entry in the state table and, if applicable, adds the parallel intent to the new entry in the state table. Control continues at 464 where, if the selected state is the last state in the state table, control transfers to 468; otherwise, control returns to 436.

At 468, control determines whether a re-crawl is desired. If so, control transfers to 408; otherwise, control remains at 468. The re-crawl may be initiated on a periodic basis or in response to a known change, such as additional states being added to the app or a new version of the app being released.

In an API comparison, the response of an API from server can be used to determine any new data and can be used to discard duplicate data. The same method can also be used to incrementally scrape data to maintain freshness. For example, API calls for a certain state can be monitored, and then the API calls can be made directly to the server without having to visit the state in an emulator. A hash value may be calculated from the response returned to the API call. If the hash value matches a previously-recorded hash value for previously-received data, the new data can be discarded.

Overall

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. An apparatus for automated acquisition of content from an application and improved searching of the content in response to a query of a user device, the apparatus comprising:
at least one processor, the at least one processor configured to track links, the tracking of links including:
controlling an executing instance of the application; and
for a selected state of the application;
controlling the executing application instance to navigate to the selected state, and
identifying a first set of application states reachable from the selected state, each of the first set of application states being reachable via a respective user interface interaction with the selected state,
wherein the at least one processor is further configured to store records in a state storage based on the first set of application states, a first state record including:
(i) a representation of content of a first state of the first set of application states, and
(ii) a unique identifier that uniquely identifies the first state within the records of the state storage, the unique identifier of the first state indicating a path followed within the executing application instance from a default state of the application to the first state, and the path including the user interface interaction corresponding to the first state,
wherein the at least one processor is further configured to scrape records, including, for each of the stored records, extract text and metadata from the state, information based on the extracted text and metadata being stored in a data store, and
wherein the at least one processor is further configured to provide at least one record in response to the query from the user device.

2. The apparatus of claim 1, wherein the link tracking by the at least one processor comprises executing the instance of the application within an emulator.

3. The apparatus of claim 1 wherein the unique identifier of the first state is a uniform resource identifier (URI).

4. The apparatus of claim 1 wherein the unique identifier of the first state is based on a concatenation, in order, of each user interface interaction triggered when navigating from the default state to the first state.

5. The apparatus of claim 1 wherein the default state is a home state of the application and wherein, upon execution, the application presents the home state to a user of the application.

6. The apparatus of claim 1 wherein the representation of the content of the first state requires less storage space than does the content of the first state.

7. The apparatus of claim 6 wherein the representation of the content of the first state is based on a calculated hash of the content of the first state.

8. The apparatus of claim 1 wherein:
the first state record includes a second unique identifier that uniquely identifies the first state within the records of the state storage; and
the unique identifier of the first state indicates a second path followed within the application from the default state to the first state.

9. The apparatus of claim 8 wherein the at least one processor is further configured to detect duplicate content, the detection comprising:
determining whether the path and the second path both arrive at the first state, and
in response to determining that the path and the second path both arrive at the first state, adding the second unique identifier to the first state record instead of creating a second state record.

10. The apparatus of claim 8, wherein the at least one processor is further configured to select a path, the selection of a path including selecting a single unique identifier for each of the records for use by the at least one processor when scraping records.

11. The apparatus of claim 10 wherein the at least one processor is further configured to, when scraping records, for each of the records in the state storage, (i) navigate to the state specified by the selected single unique identifier using the path indicated by the selected single unique identifier and (ii) extract text and metadata from the state.

12. The apparatus of claim 10 wherein the selection of a path comprises selecting, for each of the records, the single unique identifier that identifies a fastest path to the respective state.

13. The apparatus of claim 1, wherein the link tracking by the at least one processor comprises:
identifying when an application programming interface call is available for navigating to the first state; and
storing a second unique identifier in the first state record, wherein the second unique identifier indicates the application programming interface call.

14. The apparatus of claim 13 wherein the link tracking by the at least one processor comprises, for a second state reachable from the first state via a first user interface interaction:
storing a second state record in the state storage including a unique identifier based on the application programming interface call and the first user interface interaction; and
adding a second unique identifier to the second state record, wherein the second unique identifier indicates the first user interface interaction and user interface interactions followed from the default state to the first state.

15. The apparatus of claim 1, wherein the providing of at least one record comprises:
in response to the query from the user device, selecting records from the data store to generate a set of records by forming a consideration set of records;
processing the consideration set of records by assigning a score to each record of the consideration set of records; and
generating results by responding to the user device with a subset of the consideration set of records,
wherein the subset is selected based on the assigned scores, and
wherein the subset identifies application states of applications that are relevant to the query.

16. A method for automated acquisition of content from an application and provision of content for searching by a user device, the method comprising:
executing, using at least one processor of an apparatus for automated content acquisition and provision, an instance of the application;
for a selected state of the application;
(i) controlling, using the at least one processor, the executing application instance to navigate to the selected state, and
(ii) identifying, using the at least one processor, a first set of application states reachable from the selected state, each of the first set of application states being reachable via a respective user interface interaction with the selected state;
storing records in a state storage based on the first set of application states, wherein a first state record includes:
(i) a representation of content of a first state of the first set of application states, and
(ii) a unique identifier that uniquely identifies the first state within the stored records, the unique identifier of the first state indicating a path followed within the executing application instance from a default state of the application to the first state, and the path including the user interface interaction corresponding to the first state;
for each of the stored records, extracting, using the at least one processor, text and metadata from the state; and
storing information based on the extracted text and metadata in a data store.

17. The method of claim 16 wherein the instance of the application is executed within an emulator.

18. The method of claim 16 wherein the unique identifier of the first state is a uniform resource identifier (URI).

19. The method of claim 16 further comprising forming the unique identifier of the first state by concatenating, in order, each user interface interaction triggered when navigating from the default state to the first state.

20. The method of claim 16 wherein the default state is a home state of the application and wherein, upon execution, the application presents the home state to a user of the application.

21. The method of claim 16 wherein the representation of the content of the first state requires less storage space than does the content of the first state.

22. The method of claim 21 further comprising generating the representation of the content of the first state by calculating a hash of the content of the first state.

23. The method of claim 16 wherein:
the first state record includes a second unique identifier that uniquely identifies the first state within the stored records; and
the unique identifier of the first state indicates a second path followed within the application from the default state to the first state.

24. The method of claim 23 further comprising:
determining whether the path and the second path both arrive at the first state; and
in response to determining that the path and the second path both arrive at the first state, adding the second unique identifier to the first state record instead of creating a second state record.

25. The method of claim 23 further comprising selecting a single unique identifier for each of the records for use in the extracting.

26. The method of claim 25 further comprising, for each of the stored records, navigating to the state specified by the selected single unique identifier using the path indicated by the selected single unique identifier before extracting text and metadata from the state.

27. The method of claim 25 wherein the selecting includes, for each of the records, selecting the single unique identifier that identifies a fastest path to the respective state.

28. The method of claim 16 further comprising:
identifying when an application programming interface call is available for navigating to the first state; and
storing a second unique identifier in the first state record, wherein the second unique identifier indicates the application programming interface call.

29. The method of claim 28 further comprising, for a second state reachable from the first state via a first user interface interaction:
storing a second state record including a unique identifier based on the application programming interface call and the first user interface interaction; and
adding a second unique identifier to the second state record, wherein the second unique identifier indicates the first user interface interaction and user interface interactions followed from the default state to the first state.

30. The method of claim 16, further comprising:
in response to receiving a query from a user device, selecting records from the data store to form a consideration set of records;
assigning a score to each record of the consideration set of records; and
responding to the user device with a subset of the consideration set of records, wherein the subset is selected based on the assigned scores, and wherein the subset identifies application states of applications that are relevant to the query.

31. A non-transitory computer-readable medium storing processor-executable instructions configured to perform the method of claim 16.

\* \* \* \* \*